United States Patent
Levin et al.

(10) Patent No.: US 7,161,706 B2
(45) Date of Patent: Jan. 9, 2007

(54) SYSTEM FOR IMPROVING DIGITAL COPIERS AND MULTIFUNCTION PERIPHERAL DEVICES

(75) Inventors: Burton L. Levin, Lake Oswego, OR (US); John Charles Dalrymple, Portland, OR (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 641 days.

(21) Appl. No.: 09/823,457

(22) Filed: Mar. 30, 2001

(65) Prior Publication Data

US 2002/0149784 A1   Oct. 17, 2002

(51) Int. Cl.
 *G06K 15/02* (2006.01)
 *G06F 3/12* (2006.01)
(52) U.S. Cl. .................... 358/1.2; 358/1.13
(58) Field of Classification Search ........... 399/376, 399/387, 370, 365, 389; 358/1.12, 528, 474, 358/505, 449, 488, 450, 451, 1.15, 1.14, 358/1.13, 1.1, 1.16, 1.2; 382/299, 296, 298
See application file for complete search history.

(56) References Cited

U.S. PATENT DOCUMENTS

| | | | |
|---|---|---|---|
| 4,538,185 A | 8/1985 | Wiggins | |
| 4,541,713 A | 9/1985 | Maekawa | |
| 4,568,181 A | 2/1986 | Nishiyama | |
| 4,572,650 A | 2/1986 | Okuda | |
| 4,698,511 A | 10/1987 | Sueda et al. | |
| 4,737,804 A | 4/1988 | Ayata et al. | |
| 4,929,844 A | 5/1990 | Houjiyou et al. | |
| 4,954,846 A | 9/1990 | Matsuo et al. | |
| 5,058,038 A * | 10/1991 | Motoyama et al. | 358/1.2 |
| 5,099,336 A * | 3/1992 | Moriya | 358/300 |
| 5,119,130 A | 6/1992 | Tsudaka et al. | |
| 5,122,833 A | 6/1992 | Sato | |
| 5,144,452 A * | 9/1992 | Abuyama | 358/296 |
| 5,191,429 A * | 3/1993 | Rourke | 358/296 |
| 5,236,072 A | 8/1993 | Cargill | |
| 5,239,387 A | 8/1993 | Stein et al. | |
| 5,491,759 A | 2/1996 | Nagao et al. | |
| 5,568,281 A | 10/1996 | Kochis et al. | |
| 5,677,776 A | 10/1997 | Matsuda et al. | |
| 5,796,877 A * | 8/1998 | Gusmano | 382/298 |
| 5,805,294 A * | 9/1998 | Furuoya | 358/296 |
| 5,805,970 A | 9/1998 | Kasamatsu | |
| 5,818,976 A | 10/1998 | Pasco et al. | |
| 5,999,275 A * | 12/1999 | Hagihara | 358/449 |
| 6,005,683 A * | 12/1999 | Son et al. | 358/488 |
| 6,014,229 A | 1/2000 | Yun | |
| 6,046,828 A | 4/2000 | Feng et al. | |
| 6,075,623 A | 6/2000 | Yun | |
| 6,097,852 A | 8/2000 | Yamamoto | |
| 6,473,525 B1 * | 10/2002 | Cheung et al. | 382/199 |
| 6,621,944 B1 * | 9/2003 | Takahagi et al. | 382/319 |

FOREIGN PATENT DOCUMENTS

| | | |
|---|---|---|
| JP | 59005774 | 1/1984 |
| JP | 2001008021 | 1/2001 |

\* cited by examiner

*Primary Examiner*—Dov Popovici
(74) *Attorney, Agent, or Firm*—Chernoff, Vilhauer, McClung & Stenzel

(57) ABSTRACT

A digital copier or multifunction peripheral (MFP) can perform special document construction functions including "auto-sizing," scaling a copy to fit a selected size of copy medium, and "auto-cloning" printing a plurality of copies of a single original on a copy medium. The size of the original image is determined from the results of a full resolution scan of the original.

13 Claims, 3 Drawing Sheets

SYSTEM FOR IMPROVING DIGITAL COPIERS AND MULTIFUNCTION PERIPHERAL DEVICES

CROSS-REFERENCE TO RELATED APPLICATIONS

Not applicable.

BACKGROUND OF THE INVENTION

The present invention relates to digital copiers and multifunction peripherals (MFPs) and, more particularly, to copying techniques for improving the performance of a copier or MFP performing special document construction operations.

Digital photocopiers and multifunction peripherals (MFPs) (a single device that can function as a printer, a scanner, a facsimile machine, and a photocopier) (hereinafter, collectively, a "copier") can perform a number of special document construction operations. One special document construction operation is "auto-sizing" in which an original image is reproduced at a scale proportioned to fit the copy on a sheet of copy paper or other copy medium of an arbitrarily selected size. Another special copying function is "auto-cloning" where the copier produces several images of a "small" original image arrayed on a sheet of copy medium. For example, it may be desired to produce several copies of a business card on a single sheet of copy medium.

An initial step in auto-sizing or auto-cloning is to establish the size of the original document or the original image (collectively referred to herein as the "original"), as appropriate for the operation. Typically, the size of the original is determined from scan data statistics accumulated as a sensor array is moved relative to the original. The extreme positions of sensors in the array detecting putative pixels of the original are typically accumulated for establishing one set of boundaries of the original. The number of scan lines intervening between the initial and final detection of supposed pixels of the original is used in determining the second set of boundaries. The size of the original is typically determined from statistical inferences from the scan data to avoid falsely identifying dust or smudges on the platen as a document edge and to account for the likelihood that the edges of the original are not square with the sensor array of the scanner.

Typically, size determination is performed with a low resolution pre-scan where only a subset of the sensors and scan lines of a full resolution scan are read and analyzed. The low resolution scan can be performed quickly, provides adequate information to estimate the boundaries of the original with sufficient accuracy, and is computationally less expensive than a full resolution scan. For auto-sizing, a processor then determines the zoom (either magnification or reduction) required to scale at least one of the width and length of the original to fit the size of the selected copy medium. In the case of auto-cloning, the processor determines the number and arrangement of full scale copies of the original that will fit on the copy medium. After the dimensions of the original have been determined, the original is scanned a second time at full resolution. The data from the full resolution scan is processed and the image is printed. While the method produces good results, repeated scanning is time consuming, complicates the copier firmware, increases the cycling of the scanner mechanism, and requires duplication of some of the control software which increases the amount of memory required for the software.

What is desired, therefore, is a technique for determining the size of an original that reduces the complexity of the copier and the time required to perform the special document construction operations.

DETAILED DESCRIPTION OF THE INVENTION

Figure 1:
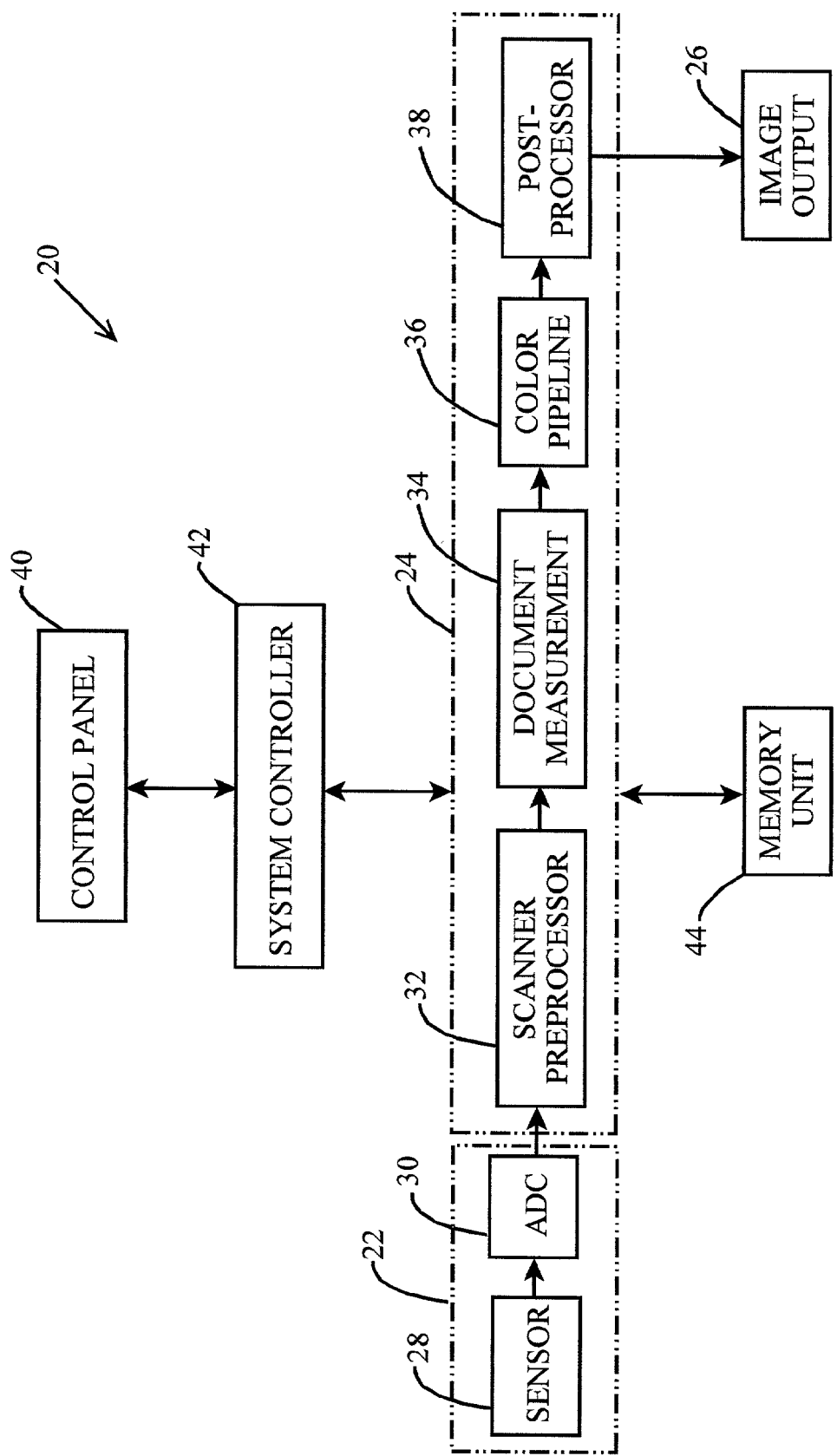
FIG. 1 is a block diagram of a digital copier.

Referring to FIG. 1, a typical digital photocopier or multifunction peripheral (a device that combines the functions of a scanner, a printer, a facsimile machine, and a photocopier in a single unit) (hereinafter, collectively, a "copier") 20 includes a scanner 22 to convert an original image to digital data describing a plurality of pixels, an image processor 24 to convert the digital data produced by the scanner section 22 to printing data, a memory 44 for storing data, and an image output unit 26 to produce an image from data processed by the image processor 24. The copier 20 also includes a system controller 42 to control the operation of the copier. A system controller 42 controls the operation of the copier and directs the image processor 24 to convert the signals output by the scanner to appropriate signals for the output unit 26. The system controller 42 and the image processor 24 may be embodied in a single element of hardware or in a plurality of hardware elements or may comprise one or more software routines performed by a processor.

The scanner section 22 typically includes a sensor array 28 comprising a plurality of photoelectric transducers, typically, CCD (charge-coupled device) sensors and a lamp to illuminate the item to be copied which is supported by a platen (not illustrated). Light reflected from an illuminated original image strikes the sensors of the sensor array 28 and is transformed to an electrical image signal that is proportional to the intensity of light reflected from a document picture element (PEL) or pixel to a corresponding sensor of the array. The signals from all sensors of the array comprise a scan line of pixels extending across the original. An analog to digital converter (ADC) 30 converts the individual electrical image signals to digital data describing the pixels of the scan line. As the sensor array 28 is moved relative to the image, the outputs of the sensors are periodically read out to produce scan data describing the pixels of a plurality of scan lines.

The image processing section 24 of a color digital copier typically includes a scanner pre-processing pipeline 32 to correct for differences in the opto-electronic properties of the individual sensors of the array 28, a document measuring section 34, and a color pipeline 36 that converts the digital scan data from the red-green-blue (RGB) color space output of the scanner section 22 to data in the CMYK color space useful in controlling the operation a printer of the image output section 26. In addition, the copier typically includes a post processing pipeline 38 that processes the data before printing to facilitate halftoning, white space compression and a number of special document construction operations.

A control panel 40 permits an operator to input commands to the system controller 42 controlling the copier's operation. Typical commands direct the copier 20 to produce specified numbers of copies, enlarge or reduce the size of copies, sort copies, or perform other special document construction operations. For some copiers these special document construction operations include "auto-sizing" and "auto-cloning." In the auto-sizing operation, the copier reduces or enlarges the original image so that the output copy image will fit correctly on a size of copy paper or other copy medium specified by the operator. When the auto-sizing function is selected at the control panel 40, the system controller 42 causes the copier 20 to determine the size of the original image and select the appropriate magnification or reduction to fit the copy image on a copy medium of a size by the operator. For the auto-cloning function, the copier 20 produces multiple copies of an original document on a single sheet of copy medium. For example, a single original of a business card can be reproduced several times on a sheet of card stock. As determined by the size of the original and the size of the copy medium a plurality of copies or clones may be arranged in a row across the copy medium (horizontal cloning) and several rows of clones may be arrayed along the length of the copy medium (vertical cloning). When auto-cloning is selected, the copier 20 determines the size of the original. The image processor 24 determines the number and arrangement of copies (clones) appropriate for the size of the copy medium, and directs the image output unit 26 to print multiple copies of the original on the copy medium.

The size of the original image or document (collectively, the "original") is typically determined from the output of the scanner 22. A number of algorithms may be used to determine the size of the original. The width of the original is typically established from statistical data related to the extreme positions of sensors in the array sensing putative pixels of the original. Likewise, the length of the original is typically determined from the number of scan lines intervening between sensing initial and last supposed pixels of the original. In practice, statistical data is used to infer the boundaries of the original to reduce the likelihood of errors due to contamination on the platen of the scanner or misalignment of the original and the sensor array. Typically, the scan data for the statistical evaluation of the size of the original is obtained from a low resolution pre-scan where data from the scanner 22 is read for only a subset of the sensors and scan lines of a full resolution scan. While the pre-scan is performed faster than a full resolution scan and produces sufficient data to determine the size of the original, pre-scanning is time consuming, increases the complexity of the copier's firmware and the amount of memory required to store the firmware, and increases the cycling of the scanner mechanism and light. The present inventors concluded that the time required for special document construction operations, the complexity of the copier's firmware, and wear and tear on the scanner could be reduced by eliminating the pre-scanning step and determining the size of the original and producing the copy from data obtained with a single, full resolution scan.

Figure 2A:
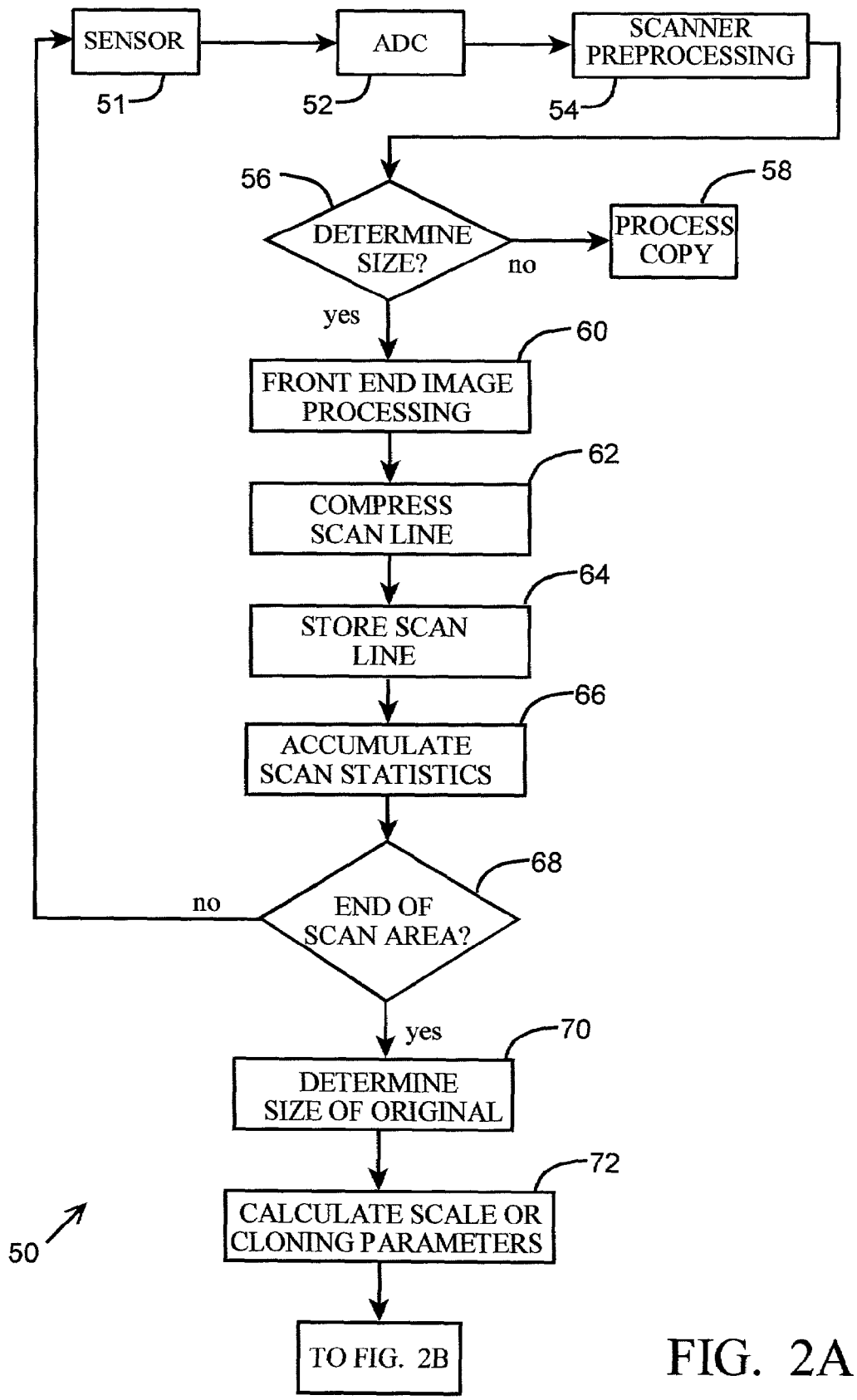
FIG. 2A is a flow diagram for the copying method of the present invention.
Figure 2B:
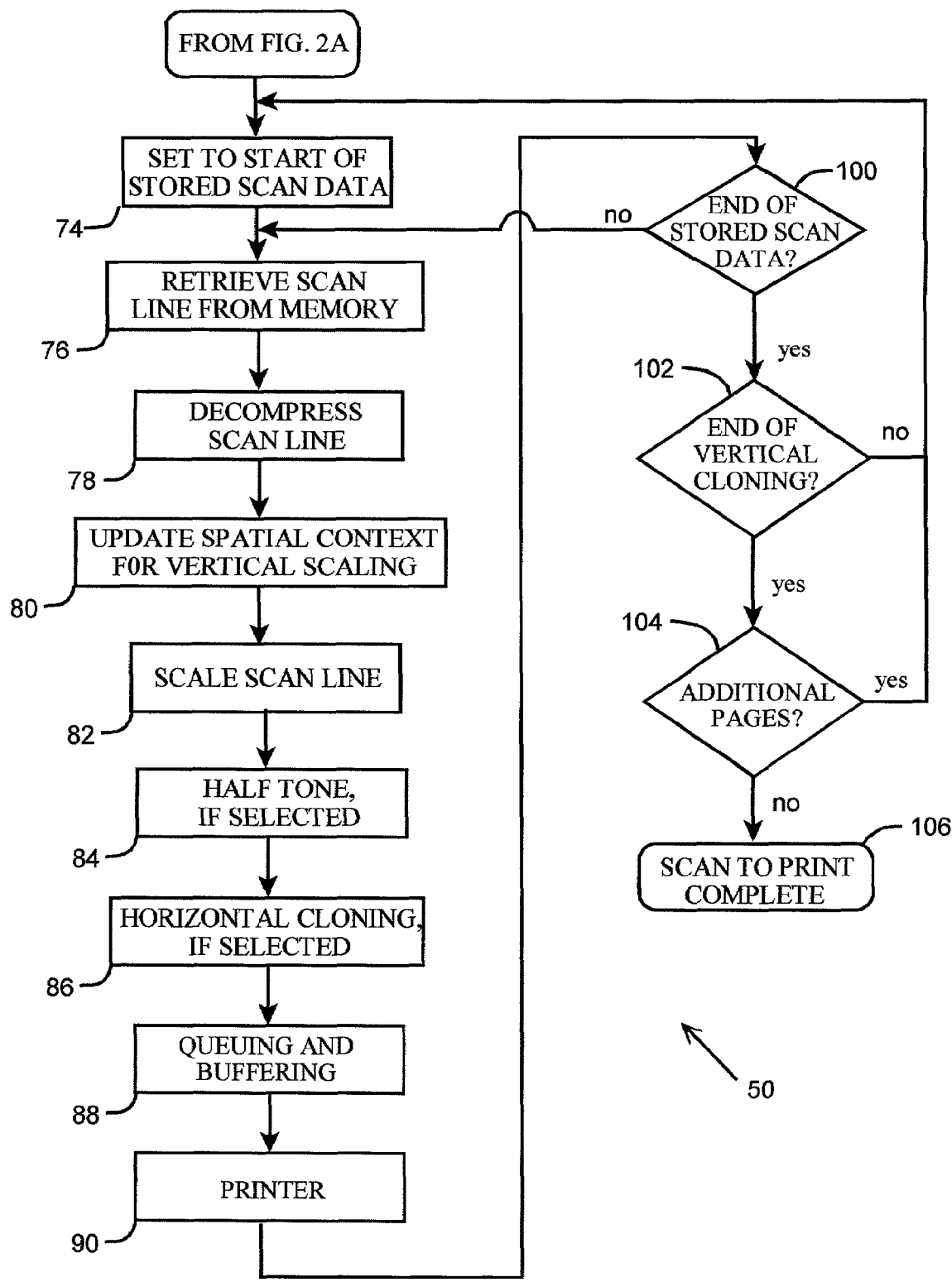
FIG. 2B is a continuation of the flow diagram of FIG. 2A.

Referring to FIG. 2A, in the copying technique 50 of the present invention, a photoelectric sensor array is moved relative to an original 51. The image signals output by the sensors 28 of the array are converted to digital signals 52 by an analog-to-digital converter (ADC) 30. In a scanner pre-processor 32, the scanner output is adjusted for differing opto-electronic sensitivities of the individual sensors in the array and the data corresponding to pixels making up the lines of the scan are designated 54. If the copying operation specified by the operator does not require that the size of the original be determined 56, the data is processed by the copier to produce the required copy 58. If the size of the original is to be determined 56 for auto-sizing, auto-cloning, or another document construction operation, the scan data undergoes front end processing 60 before the scan line data is compressed 62 and stored 64. Front end processing 60 comprises several processes that can be performed concurrently and are useful for either determining the size of the original or preparing the scan data for production of the copy even though the size of the copy is unknown. Front end processing 60 may include updating of the spatial context of the scan data from data contained in one or more previous scan lines and color conversion from the red-green-blue (RGB) color space produced by the scanner to color values in the CMYK color space for controlling the operation of a printer. Front end processing 60 may also include background removal to convert the background color of the original copy medium to white to facilitate white space compression and image segmentation to distinguish objects from the image's background and filter natural images and text from a combined image. The availability of a complete set of scan data from a full resolution scan permits concurrent or simultaneous processing for the purposes of establishing the size of the original and producing the copy.

Statistical information to be used in identifying the boundaries of the original is determined from the scan data and accumulated 66. Algorithms used by a typical document measuring unit 34 generally utilize statistical information obtained from scan data for a plurality of scan lines to determine the location of the boundaries of the scanned original. For example, the location of a boundary of the original may be determined from statistical data related to the location of the sensors in a scan line corresponding to detection of a pixel at the boundary of the original. Likewise, a dimension of an original can be obtained by determining a number of scan lines intervening between scan lines corresponding to top and bottom boundaries of the original. Statistical analysis of data obtained from several scan lines reduces the likelihood that dust or other contamination on the platen or document will be seen as the edge of the original. Likewise, statistical information is useful in identifying the boundary of the original if the placement of the original on the platen was skewed relative to the scanner array. The process may identify opposing boundaries of the original or a single boundary's displacement from an origin established for locating the document on the platen.

If the scan has not been completed 68, the system controller 42 advances the scanner and the scanning process is repeated for the next scan line. If the scanner has reached the end of the scan area 68, the image processor 24 uses the accumulated scan statistics 66 to determine at least one dimension of the original 70.

Using the dimensions of the original, the image processor 24 determines the appropriate scaling parameters for auto-sizing and cloning parameters for auto-cloning 72. Typically, for auto-sizing an enlargement or reduction is computed that will scale at least one of the transverse or vertical dimensions of the original to fit a scaled copy within the boundaries of the printable area of a copy medium of a selected size. For auto-cloning, the image processor 24 calculates or determines from a lookup table a number of copies or clones of the dimensions of the original that will fit within in the transverse dimension of the printable area of the copy medium (horizontal cloning) and the number of rows of clones that will fit in the vertical dimension of the printable area of the copy medium (vertical cloning).

In the stored scan data, the image processor 24 locates the beginning of the scanned data describing the original 74 and retrieves the scan data for the first line from memory 76. The scan data is decompressed 78 and the spatial context of the data is updated for vertical scaling 80. If enlargement or reduction is required, pixels produced from the scan data are computed in the horizontal and vertical directions 82, as appropriate. If halftoning is to be applied, pixels of the scan line are processed as required by the copier's halftoning algorithm 84. If horizontal cloning is to be applied, the image processor 24 obtains the cloning parameters 72 and creates the appropriate raster data to produce the specified horizontal arrangement of copies 86. The rasterized scan data is queued and buffered 88 in anticipation of printing 90.

If the scan line being processed is not the end of the scan data representing the original 100, the next line of scan data is retrieved from memory 76 and processed. However, if the end of the scan data representing the original has been reached, the image processor 24 determines if auto-cloning has been selected and if the required number of vertical clones has been processed 102. If the vertical clones specified by the cloning parameter 72 have not been completed, the image processor 24 returns to the stored scan data representing the beginning of the original 74, obtains the initial scan line, and repeats the process. If the specified number of vertical clones has been completed 102, the system determines if all of the pages required for the print job have been completed 104. If not, the image processor 24 returns to the beginning of the stored data representing the original 74 and retrieves the first scan line 76 for processing for the next page. If the required number of pages has been completed 104, the print job is complete 106.

Some special document construction operations, such as auto-cloning and auto-sizing require that the size of the original be determined before the copies are produced. Determining the size of the original and producing the copy from the same set of scan data obtained with a single full resolution scan reduces the time required to produce copies, wear and tear on the scanner, the complexity of the copier control firmware and the firmware storage requirements.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of producing a copy of an original scaled to fit a selected copy medium comprising the steps of:
   (a) performing a first scan of said original at a full resolution to convert said original to a plurality of scan data representing a plurality of pixels of said original;
   (b) determining at least one of a magnification and a reduction of said original to scale a copy of said original to fit at least one of a length and a width of said copy medium using only said plurality of scan data from said first scan;
   (c) printing said copy from said scan data at one of said determined magnification and reduction using said plurality of scan data stored in a memory from said first scan; and
   (d) where said step of determining at least one of a magnification and a reduction of said original is performed over a time interval that begins before data from said first scan is written into said memory, and is performed concurrently with processing of said scan data for image reproduction characteristics other than scaling over at least a portion of said time interval.

2. The method of claim 1 wherein the step of determining at least one of a magnification and a reduction of said original to scale a copy of said original to fit at least one of a length and a width of said copy medium comprises the steps of:
   (a) identifying a first line of scan data corresponding to a first boundary of said original;
   (b) identifying a second line of scan data corresponding to a second boundary of said original;
   (c) determining a number of lines intervening between said first and said second lines; and
   (d) calculating a scale of said number of lines not exceeding at least one of said length and said width of said copy medium.

3. The method of claim 2 wherein the step of identifying a line of scan data corresponding to a boundary of said original comprises the step of identifying a line of said scan data comprising a scan datum corresponding to a pixel of said original.

4. The method of claim 1 wherein the step of determining at least one of a magnification and a reduction of said original to scale a copy of said original to fit at least one of a length and a width of said copy medium comprises the steps of:
   (a) locating a first boundary datum of said original in a first line of scan data;
   (b) locating a last boundary datum of said original in said first line of scan data;
   (c) repeating steps (a) and (b) for another line of scan data;
   (d) locating a first boundary of said original from a location of at least one said first boundary datum of at least one of said first and said another line of scan data;
   (e) locating a second boundary of said original from a location of at least one said last boundary datum of at least one of said first and said another line of scan data; and
   (f) calculating a scale of a distance between said first and said last boundary not exceeding at least one of said width and said length of said copy medium.

5. The method of claim 4 wherein the step of locating a boundary datum of said original in a line of scan data comprises the step of detecting a scan datum corresponding to a pixel of said original.

6. The method of claim 1 wherein the step of determining at least one of a magnification and a reduction of said original to scale a copy of said original to fit at least one of a length and a width of said copy medium comprises the steps of:
   (a) identifying a plurally of said scan data corresponding to a line of scanned pixels;
   (b) locating a detected pixel of said original in a line of scanned pixels;
   (c) repeating steps (a) and (b) for a plurality of lines of a full resolution scan of said original;
   (d) locating a boundary of said original from a location of a said detected pixel of at least one line of scanned pixels;
   (e) calculating a dimension of said original from said location of said boundary; and
   (f) calculating at least one of a magnification and a reduction to scale said dimension of said original to fit at least one of said length and said width of said copy medium.

7. A method of producing a copy of an original scaled to fit a selected copy medium, the method comprising the steps of:

(a) performing a first scan of a line of pixels of said original to convert said pixels to scan data and transforming said data to facilitate calculation of a dimension of said original;

(b) detecting a pixel of said original in a line of scanned pixels;

(c) repeating steps (a) and (b) for a plurality of lines of a full resolution scan of said original;

(d) locating a boundary of said original from a position of a detected pixel using only said scan data from said first scan;

(e) calculating a dimension of said original from a location of said boundary using only said scan data from said first scan;

(f) calculating at least one of a magnification and a reduction to scale said dimension of said original to fit a selected size of a copy medium using only said scan data from said first scan;

(g) printing a copy of said original from said scan data at one of said calculated magnification and reduction using said scan data stored in a memory from said first scan; and (h) where said transforming said data is performed over a time interval that begins before said scan data is written into said memory, and is performed concurrently with processing of said scan data for image reproduction characteristics other than scaling over at least a portion of said time interval.

8. The method of claim 7 further comprising the steps of:

(a) storing said scan data; and (b) printing said copy from said stored scan data.

9. The method of claim 7 wherein the step of calculating a dimension of said original from said location of said boundary comprises the steps of:

(a) identifying a scan line corresponding to a first boundary of said original;

(b) identifying another scan line corresponding to a second boundary of said original; and (c) determining a number of scan lines intervening between said scan line and said another scan line.

10. A method of producing a plurality of copies of an original on a copy medium comprising the steps of:

(a) performing a first scan to convert a line of pixels of said original to scan data and transforming said data to facilitate calculation of a dimension of said original;

(b) detecting a pixel of said original in said line of scanned pixels;

(c) repeating steps (a) and (b) for a plurality of lines of a full resolution scan of said original;

(d) locating a boundary of said original from a said detected pixel of at least one said line of scanned pixels using only said scan data from said first scan;

(e) calculating a size of said original from a location of said boundary using only said scan data from said first scan;

(f) calculating a multiple of said size that will not exceed a dimension of a selected copy medium using only said scan data from said first scan;

(g) printing from said scan data a plurality of copies of said original equal to said multiple using said scan data stored in a memory from said first scan; and (h) where said transforming said data is performed over a time interval that begins before said scan data is written into said memory, and is performed concurrently with processing of said scan data for image reproduction characteristics other than sealing over at least a portion of said time interval.

11. The method of claim 10 further comprising the steps of:

(a) storing said scan data; and (b) printing a copy from said stored scan data.

12. The method of claim 10 wherein the step calculating a size of said original image from said location of said boundary comprises the steps of:

(a) identifying at least two scan lines each including a detected pixel of said original;

(b) locating a first boundary and a second boundary of said original according to a relationship of said detected pixels; and (c) calculating a number of scan lines intervening between said first and said second boundaries.

13. The method of claim 10 wherein the step calculating a size of said original image from said location of said boundary comprises the steps of:

(a) detecting a first pixel of said original in a line of scanned pixels;

(b) detecting another pixel of said original in a line of scanned pixels;

(c) locating a first boundary of said original from a location of said first detected pixel;

(d) locating another boundary of said original from a location of said another detected pixel; and (e) calculating a distance separating said first boundary and said another boundary.

* * * * *

UNITED STATES PATENT AND TRADEMARK OFFICE
CERTIFICATE OF CORRECTION

PATENT NO. : 7,161,706 B2  Page 1 of 1
APPLICATION NO. : 09/823457
DATED : January 9, 2007
INVENTOR(S) : Burton L. Levin It is certified that error appears in the above-identified patent and that said Letters Patent is hereby corrected as shown below:

Title Page Item [54] and Col. 1, lines 1-3
Change "SYSTEM FOR IMPROVING DIGITAL COPLERS AND MULTIFUCTION PERIPHERAL DEVICES" to --SYSTEM FOR IMPROVING DIGITAL COPIERS AND MULTIFUNCTION PERIPHERAL DEVICES--.

Col. 6, line 50 Claim 6
Change "a plurally of" to --a plurality of--.

Col. 8, line 18 Claim 10
Change "than sealing over" to --than scaling over--.

Signed and Sealed this

Fourth Day of November, 2008

JON W. DUDAS
*Director of the United States Patent and Trademark Office*